(12) United States Patent
Anselment et al.

(10) Patent No.: US 9,612,138 B2
(45) Date of Patent: Apr. 4, 2017

(54) SENSOR AND METHOD FOR THE SELECTIVE CONNECTION AT TWO DIFFERENT SIDES

(71) Applicant: SICK AG, Waldkirch (DE)

(72) Inventors: Christoph Anselment, Waldkirch (DE); Jakob Burger, Waldkirch (DE)

(73) Assignee: SICK AG, Waldkirch (DE)

( * ) Notice: Subject to any disclaimer, the term of this patent is extended or adjusted under 35 U.S.C. 154(b) by 239 days.

(21) Appl. No.: 14/540,386

(22) Filed: Nov. 13, 2014

(65) Prior Publication Data

US 2015/0143902 A1    May 28, 2015

(30) Foreign Application Priority Data

Nov. 28, 2013    (DE) .................. 10 2013 113 174

(51) Int. Cl.
*H01J 40/14* (2006.01)
*G01D 11/24* (2006.01)

(52) U.S. Cl.
CPC .................. *G01D 11/245* (2013.01)

(58) Field of Classification Search
CPC .................................... G01D 11/245
USPC ...................................... 250/239
See application file for complete search history.

(56) References Cited

U.S. PATENT DOCUMENTS

| 4,886,938 | A | 12/1989 | Rottmar et al. |
| 6,091,200 | A * | 7/2000 | Lenz .................. F21V 23/0442 315/158 |
| 2002/0074997 | A1 | 6/2002 | Smith, Jr. et al. |
| 2005/0234681 | A1 | 10/2005 | Johnson et al. |
| 2009/0107236 | A1 | 4/2009 | Lohr et al. |
| 2012/0051011 | A1 | 3/2012 | Ochi |

FOREIGN PATENT DOCUMENTS

| DE | 1018502 | 10/1957 |
| DE | 2237580 | 2/1973 |
| DE | 9204623.1 U1 | 7/1992 |
| DE | 4232474 A1 | 3/1994 |
| DE | 4120752 C2 | 4/1995 |
| DE | 19948400 A1 | 5/2001 |
| DE | 10003343 A1 | 6/2001 |
| DE | 10119910 C1 | 8/2002 |
| DE | 202004013074 U1 | 12/2004 |

(Continued)

OTHER PUBLICATIONS

Office Action from German Patent Office dated Dec. 15, 2014.
Search report mailed Mar. 23, 2015 for counterpart European application No. 14188503.8.

*Primary Examiner* — Thanh Luu
(74) *Attorney, Agent, or Firm* — Nath, Goldberg & Meyer; Jerald L. Meyer

(57) ABSTRACT

A sensor (10) having a housing (12) is provided which has a main housing part (14) and a connection part (16) having a connection (18, 20, 22), wherein the connection part (16) is movably attached at the main housing part (14), in such a way that the connection (18, 20, 22) is selectively accessible from two sides of the housing (12). In this connection the connection part (16) has at least three connections (18, 20, 22) and is movable at the main housing part (14) in such a way that the at least three connections (18, 20, 22) are selectively accessible from two sides of the housing (12).

9 Claims, 3 Drawing Sheets

(56) References Cited

FOREIGN PATENT DOCUMENTS

Figure 1:
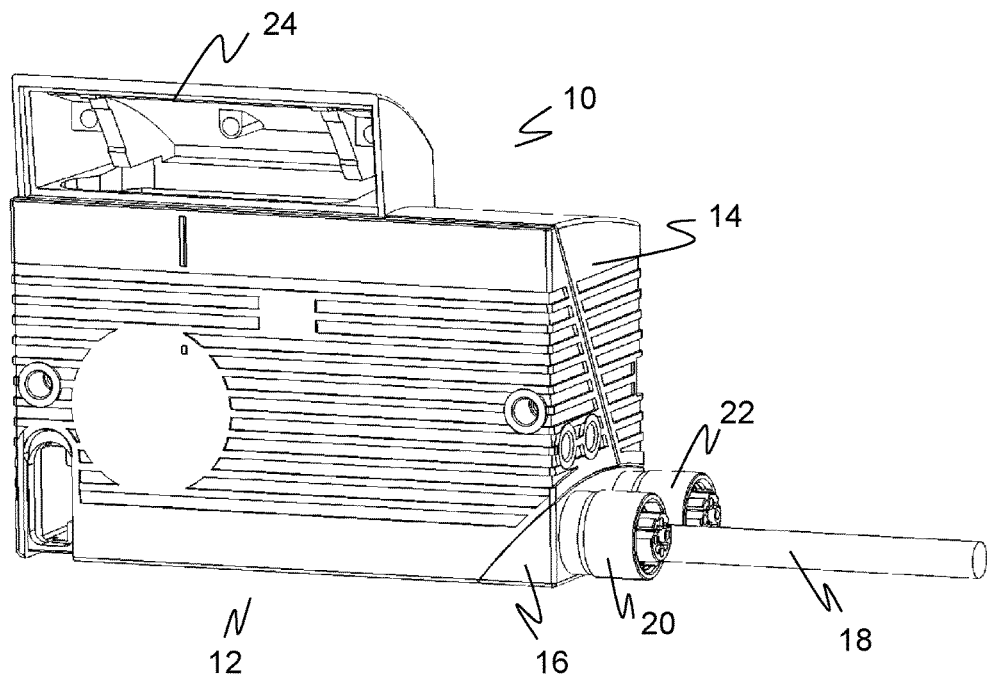

| | | |
|---|---|---|
| DE | 102004030666 B4 | 4/2006 |
| DE | 202006006614 U1 | 7/2006 |
| DE | 102004040469 B4 | 12/2006 |
| DE | 102007037759 A1 | 2/2009 |
| DE | 102007061818 A1 | 7/2009 |
| DE | 10017335 B4 | 3/2011 |
| DE | 202013103857 U1 | 11/2013 |
| EP | 0043385 A1 | 1/1982 |
| EP | 2253940 A2 | 11/2010 |
| EP | 1847004 B1 | 5/2012 |
| EP | 2515388 B1 | 8/2014 |
| EP | 1901043 B2 | 9/2014 |
| EP | 1985976 B1 | 11/2014 |

* cited by examiner

SENSOR AND METHOD FOR THE SELECTIVE CONNECTION AT TWO DIFFERENT SIDES

The invention relates to a sensor whose connection is selectively accessible from two sides, as well as to a method for the selective connection of a sensor.

For the detection of information from a monitored zone diverse principles of sensing are known. A large sensor family is formed by the optoelectronic sensors which utilize light for the extraction of such information. However, also different wavelengths, for example in radar sensors or microwave sensors or different physical interactions are utilized, such as in capacitive sensors, inductive sensors or sensors based on ultrasound.

Independent of the sensor principle the sensors must make available connections in order to be parameterized, to output measurement results and not least to be supplied with energy. Since this is not possible in a wireless manner with regard to the predominant number of cases, lines have to be guided at the connections of the sensors and from there into the interior of their housing. This in many operating positions and assembly positions leads to difficulties, as the connections must remain accessible. A common sensor does not form a smooth surface at the side or the sides at which the connections are present and for this reason cannot be attached at these sides to a wall or to other planar assembly surfaces in a flush manner.

In the state of the art, for example in the DE 92 04 623 U, it is suggested to accommodate the connection region in a rotatable edge piece of the sensor housing. The edge piece can selectively be rotated into two different positions, in which the connection is respectively present at a different side surface of the housing. Thereby the direction in which the connection region of the sensor faces can be set in dependence on the desired operating situation. In this connection, however only one single connection is provided. Additional connections are not possible without further ado, as, for example, two cable feedthroughs of the edge piece lying next to one another would block the rotation. Moreover, problems arise with the screening (EMC) which can cause both interferences of the signals at the connection lines and in this way interference at the sensors or vice versa also as interference radiation in the environment.

For this reason it is the object of the invention to improve the connection possibilities of a sensor.

This object is satisfied by a sensor and by a method for the selected connection of a sensor as described herein. The actual functional elements of the sensor are accommodated in a main housing part. The housing furthermore has a connection part movable relative to the main housing part. The invention is then based on the basic idea of accommodating a plurality of connections at the connection part in such a way that these connections are accessible from different sides in dependence on the position of the movable attachment part.

The invention has the advantage that the connection and assembly of the sensors is facilitated, as a selection exists in which direction the connections face. Thereby the sensor can be assembled with each housing side at a planar surface in a flush manner without interfering with the connections or lines connected thereto. This flexible variable connection possibility is achieved with a minimum demand in effort and cost and with minimum spatial requirements.

The connection part preferably has a common feedthrough in order to guide lines from the three connections into the interior of the housing. The lines from the three connections are in this connection combined in the common feedthrough at an axis. This reduces the number of required feedthroughs and enables the rotation of the connection part about the common axis with respect to the main housing part.

The common feedthrough is preferably of cylindrical design. Thereby a rotation of the connection part with respect to the main housing part is supported, wherein the middle axis of the cylinder forms the axis of rotation.

The common feedthrough preferably has three chambers separate from one another in order to respectively guide a line from one of the three connections. The lines are thus very compact in a narrow space and are still guided with a secure EMC chamber separation. This prevents mutual interferences of the signals at the lines.

The common feedthrough is preferably formed as a double walled cylinder having a first chamber in the interior and further chambers as sections of the concentrically surrounding region between the two jacket surfaces of the double cylinder, with the sections being separated by a wall. A line then extends centrally at the central axis of the cylinder. In a cross-sectional view the further chambers form a concentric circular ring about the first chamber which they share, in particular in a uniform manner. Having regard to two further chambers each further camera thus preferably requires 180° of the circular ring. The further chambers are separated amongst one another by means of walls extending in the height direction of the cylinder, with the walls in the cross-sectional view each connecting the double walls at a diameter of the circular surface of the cylinder.

The three connections are preferably arranged in a row. Thereby the connections are easily accessible and cables can be guided to the sensor in an orderly manner.

The central connection is preferably connected to a line running through the first chamber and the further connections are preferably each connected to a line running through the respective further chamber. The central connection towards the outside is in this connection likewise connected to a middle central line in the feedthrough. The further lines are located symmetrically with respect to the sides of the central lines in the further chambers formed concentrically about the central first chamber.

The connections preferably comprise a supply connection and to profinet connections. The supply, in particular a voltage connection, is preferably a supply with possible switching inputs and outputs. The profinet connections are preferably designed in a standard size, for example as an M12 connection. In an advantageous arrangement the supply connection is present in the center with two laterally arranged profinet connections. Then the profinet lines symmetrically and concentrically, in the further chambers in the feedthrough, surround the supply line in the central first chamber. The guidance in secure EMC chambers is particularly advantageous with regard to profinet, as profinet would otherwise be very susceptible to interference with regard to its very high data transfer rate.

The housing is preferably configured of substantially parallelepiped design and the connection piece forms a rotatable edge piece of the parallelepiped. The housing thus has a front side and a rear side, as well as four side surfaces which are each at least substantially formed flat. Additionally assemblies, such as a mirror assembly or curvatures and like design elements which deviate from the parallelepiped shape, are, however, plausible. The rotatable connection part enables the connections to be accessible from different sides of the housing in a particularly simple manner. Thus, for example, a rotation of 90° leads thereto that connections of a side surfaces are rotated to the front side or to the rear side, whereas a rotation about 180° rotates the connections from the right or the left side surface to the lower or upper side surface.

The housing preferably has an EMC chamber which screens the region of the connection part from the remaining sensor. This is, for example, achieved by an additional wall in the housing interior. The connection region is in this way screened in both directions.

The method in accordance with the invention can be furthered in a similar manner and in this connection has similar advantages. Such advantageous features are described by way of example, but not conclusively in the dependent claims adjoining the independent claims.

Figure 2:
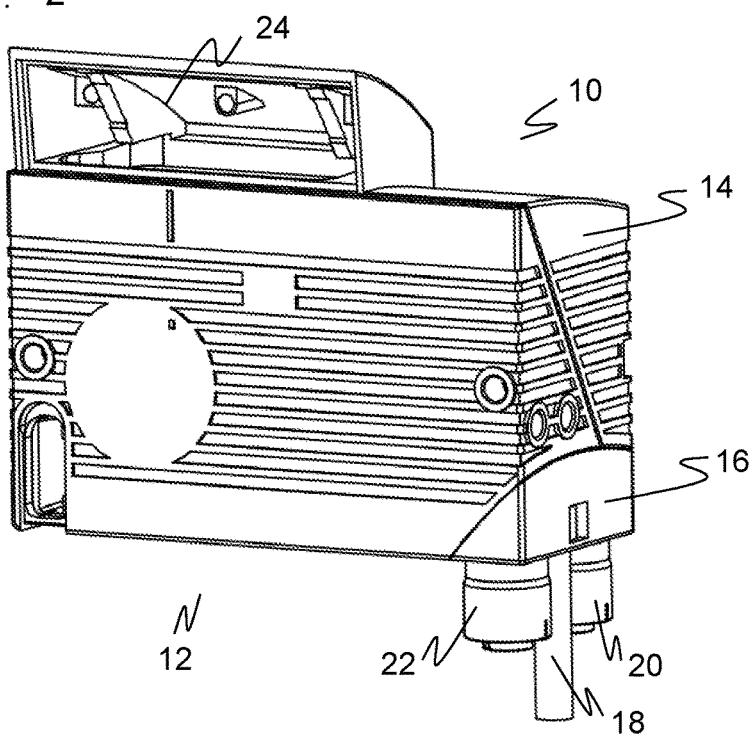
Figure 3:
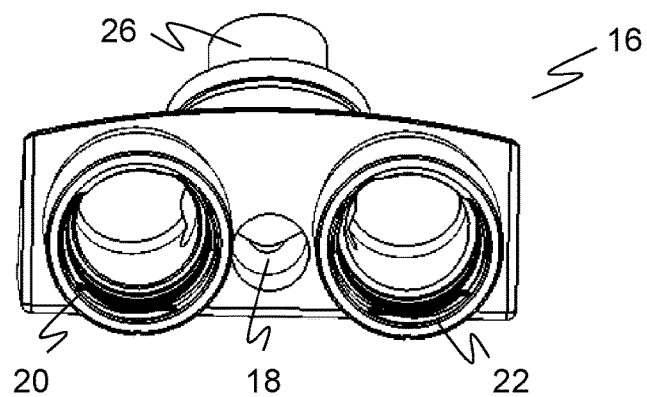
Figure 4:
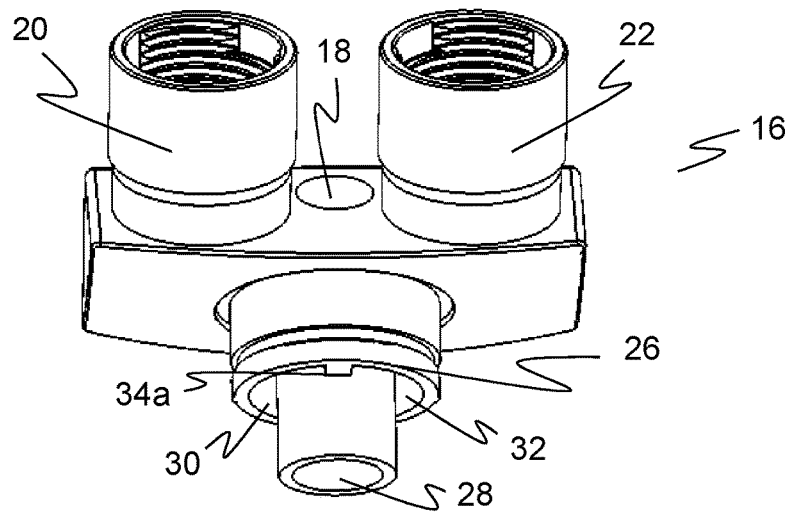
Figure 5:
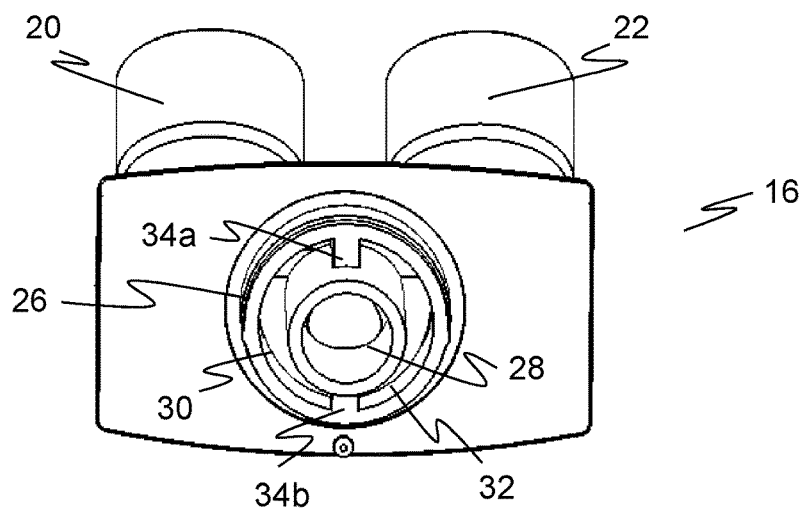
Figure 6:
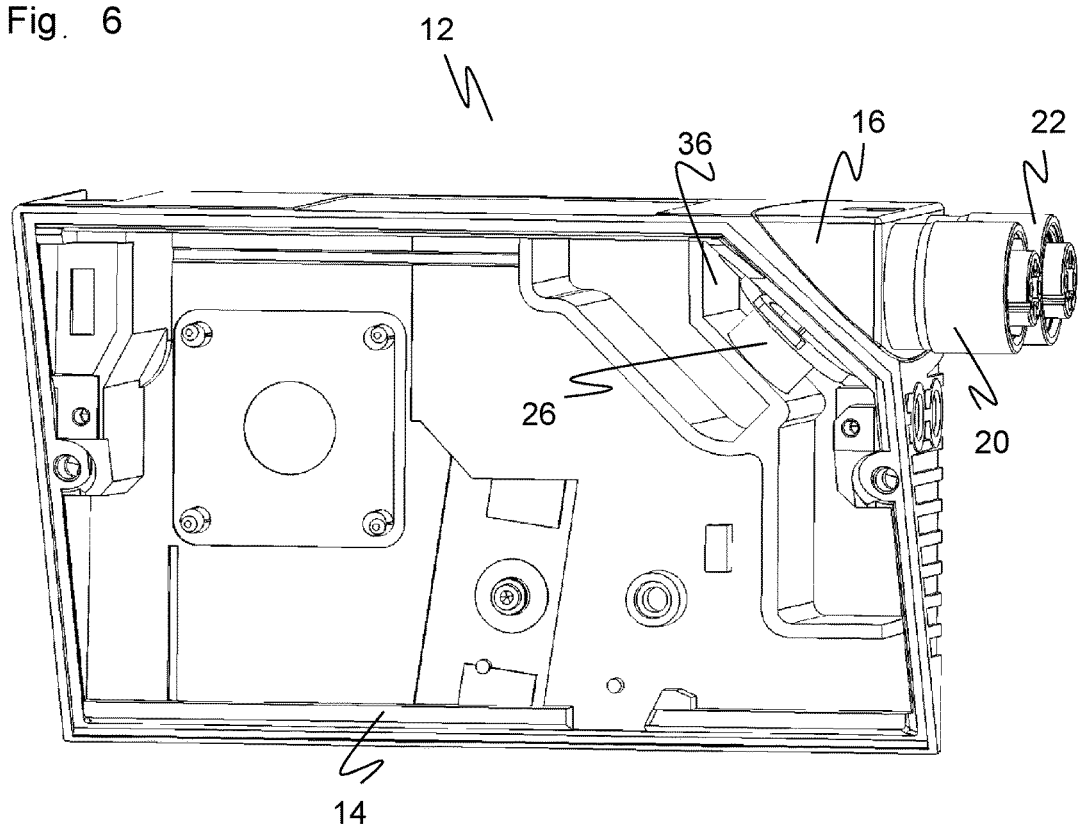

The invention will be described in the following in detail also with respect to further features and advantages by way of example by means of embodiments and with reference to the submitted drawing. The illustrations of the drawings show in:

FIG. 1 a three-dimensional view of a sensor having a connection part aligned with respect to a first side;

FIG. 2 a three-dimensional view of the sensor in accordance with FIG. 1 having a connection part rotated to a second side;

FIG. 3 a three-dimensional view of the connection part from the outside onto the connections;

FIG. 4 a view onto the connection part in accordance with FIG. 3 from above;

FIG. 5 a view onto the connection part in accordance with FIG. 3 from the inside onto the feedthrough and its chambers; and FIG. 6 a top view into the open housing of the sensor in accordance with FIG. 1.

FIG. 1 shows a three-dimensional view of a sensor 10, its housing 12, a main housing part 14 having the essential functional components of the sensor 10 and a connection part 16 having three connections 18, 20, 22. Having regard to the illustrated sensor 10 it is a bar code scanner whose scanning beam is guided over a mirror of an attachment 24. The invention however also comprises different sensors, for example, camera-based code readers having an image sensor and an evaluation unit which identifies and decodes code regions in the recorded image data, cameras for the automatic inspection of object properties or generally optoelectronic sensors, such as laser scanners, light grids, light barriers or light scanners. It is also plausible to use sensors not based on light, as mentioned by way of example in the introduction. At this point, no further reference will be made to the respective sensing principle known per se.

The connections 18, 20, 22 serve the purpose of exchanging data with the sensor 10 and of supplying it. In the illustrated embodiment the middle connection 18 is provided for a supply line, whereas the two outer connections 20, 22 are M12 profinet connections. This arrangement and kind of the connections 18, 20, 22 is to be understood preferably but still by way of example.

At an operating position of the sensor 10 the connections 18, 20, 22, as well as the cables connected thereto can interfere in the lateral positions of the connection part 16 in accordance with FIG. 1, for example, when a wall is located at the right hand side. This arrangement and orientation of the connections 18, 20, 22 is advantageous in contrast thereto when, for example, the sensor contacts with its lower side.

The connection part 16 can be rotated with respect to the main housing part 14, in such a way that the connections 18, 20, 22 point in a different direction. FIG. 2 illustrates the case following a rotation of the connection part 16 by 180°. The connections 18, 20, 22 point downwardly in such a way that the sensor 10 provides a smooth connection surface towards the right hand side. Thus, the sensor 10 can, for example, be mounted in a corner of a room with direct contact to a wall present at the right hand side.

The FIGS. 3 to 5 represent the connection part 16 in a three-dimensional view. In this connection the FIG. 3 shows a view from the outside onto the connections 18, 20, 22, FIG. 5 shows a view from the interior onto a common feedthrough 26 for the lines of the connections 18, 20, 22 into the interior of the sensor 10 and FIG. 4 shows an intermediate perspective in order to better understand the assembly of the connection part 16.

The connection part 16 has three circular feedthroughs 18, 20, 22 open to the outside, which are provided with the same reference numerals as the connections 18, 20, 22 arranged thereat, but not illustrated in the FIGS. 3 to 5. The feedthroughs 18, 20, 22 are guided inwardly at an axis of the common feedthrough 26.

The common feedthrough 26 is as a whole of cylindrical design and thus predefines the axis of rotation for the rotation of the connection part 16 with respect to the main housing part 14. In the illustration of the FIG. 5 it can be recognized that the common feedthrough 26 not only makes available a common guide for the lines of all connections, but at the same time makes available a chamber separation for the individual lines.

For this purpose the feedthrough 26 as a whole has the form of a concentric double cylinder. The inner jacket surface surrounds an inner chamber 28 for a line of the middle connection 18, for example, a supply line. In a cross-sectional consideration a concentric circular ring arises between the two jacket surfaces. The space forming through a displacement of the circular ring in the height direction of the cylinder is shared to the same degree by two further chambers 30, 32 for the lines of the outer connections 20, 22, for example profinet lines. The further chambers are separated from one another by intermediate walls 34a-b which run in the height direction and at the diameter of the basic surface of the cylinder.

In a very compact assembly the connection part 16 enables the different positions of rotation of the connections 18, 20, 22, for example in accordance with FIGS. 1 and 2, and at the same time ensures a secure EMC chamber separation. This is of particular advantage with regard to the screening of the profinet lines having a high data rate.

FIG. 6 shows a top view into the open housing 12 of the sensor 10. A wall 36 forms a chamber in the housing 12 which screens the complete connection region around the connection part 16. Thereby, the connections 18, 20 and 22 and the functional components present in the main housing part 14 are screened from one another for the actual sensor function.

The invention claimed is:

1. A sensor, comprising a housing, which has a main housing part and a connection part with a connection, wherein the connection part is movably attached at the main housing part in such a way that the connection is selectively accessible from two sides of the housing,
    wherein the connection part has at least three connections and is movable at the main housing part in such a way that the at least three connections are selectively accessible from two sides of the housing,
    wherein the connection part has a common feedthrough in order to guide lines therein from the at least three connections into the interior of the housing, and wherein the common feedthrough is designed as a double-walled cylinder having a first chamber in the interior and further chambers as sections of the concentrically surrounding region between the two jacket surfaces of the double cylinder, the sections being separated from one another by a wall.

2. The sensor in accordance with claim 1, wherein the sensor is an optoelectronic sensor.

3. The sensor in accordance with claim 1,
wherein three connections are provided and the common feedthrough has three chambers separate from one another in order to respectively guide a line from one of the three connections.

4. The sensor in accordance with claim 1,
wherein the at least three connections are arranged in a row.

5. The sensor in accordance with claim 1,
wherein the at least three connections are arranged in a row; and wherein a central connection is connected to a line running through the first chamber and the further connections are each connected to a line respectively running through a further chamber.

6. The sensor in accordance with claim 1,
wherein the housing is of substantially parallelepiped shape and the connection part forms a rotatable edge piece of the parallelepiped.

7. The sensor in accordance with claim 1,
wherein the housing has an EMC chamber which screens a region of the connection part from the remainder of the sensor.

8. A sensor, comprising a housing, which has a main housing part and a connection part with a connection, wherein the connection part is movably attached at the main housing part in such a way that the connection is selectively accessible from two sides of the housing,
wherein the connection part has at least three connections and is movable at the main housing part in such a way that the at least three connections are selectively accessible from two sides of the housing, and
wherein the at least three connections comprise at least one Profinet connection.

9. A method for the selective connection of a sensor in a housing from two different sides, in that a connection part of the housing is moved relative to a main housing part of the housing in dependence on the selected side or is left in its position such that a connection of the connection part becomes accessible from the selected side,
wherein the sensor can be connected via three lines to the connections of the connection part and in that the three connections are made accessible from the selected side on a movement of the connection part relative to the main housing part,
wherein the connection part has a common feedthrough in order to guide lines therein from the at least three connections into the interior of the housing, and
wherein the common feedthrough is designed as a double-walled cylinder having a first chamber in the interior and further chambers as sections of the concentrically surrounding region between the two jacket surfaces of the double cylinder, the sections being separated from one another by a wall.

\* \* \* \* \*